Jan. 10, 1928.  
L. B. CASE  
1,656,041

STICK TURNING MECHANISM

Filed Oct. 15, 1925

Inventor:-  
Lynn B. Case.  
by his Attorneys  
Howson & Howson

Patented Jan. 10, 1928.

1,656,041

UNITED STATES PATENT OFFICE.

LYNN B. CASE, OF HIGHLAND PARK, MICHIGAN, ASSIGNOR TO JOHN WALDRON CORPORATION, OF NEW BRUNSWICK, NEW JERSEY, A CORPORATION OF NEW JERSEY.

STICK-TURNING MECHANISM.

Application filed October 15, 1925. Serial No. 62,565.

The invention relates to mechanisms for automatically turning the sticks of conveyers of the type used for carrying festooning lines of fabric through drying chambers. It is desirable in conveyers of this type to slightly rotate the sticks from time to time so as to bring the sticks into engagement with different portions of the fabric. If the sticks were not turned during drying, the fabric might adhere to the sticks or might be otherwise detrimentally affected in texture or in appearance. By turning the sticks from time to time no one portion of the fabric remains in contact long enough to be injured.

One of the objects of the invention is to provide a very simple and inexpensive mechanism for this purpose which operates frictionally and which is adapted to engage sticks which are round at their ends instead of being flatted.

Another object of the invention is to provide a mechanism which is readily adjustable to change the amount of turning of the successive sticks.

Other objects of the invention will be fully apparent from the following specification and claims.

In the accompanying drawing, I have shown the embodiment of the invention which I now deem preferable, but it will be understood that the drawing is for the purpose of illustration only and that various changes and substitutions may be made within the scope of the claims without departing from the spirit of the invention.

Figure 1:
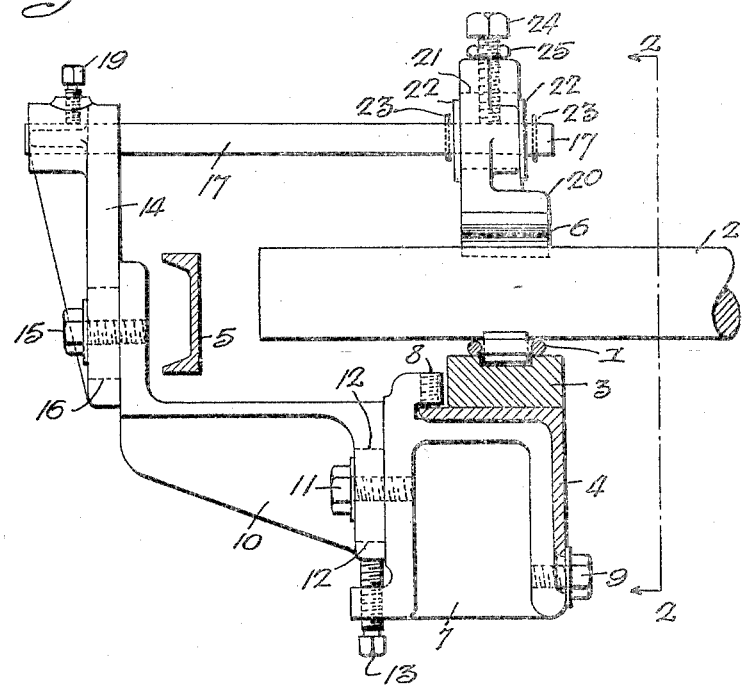
Fig. 1 is an elevational view of one of the mechanisms embodying the invention, this view being taken transversely of the conveyer and being partly in section along the line 1—1 of Fig. 2.

Referring to the drawing, 1 represents one of the two parallel conveyer chains which carry a series of transverse sticks 2, 2 approximately uniformly spaced. Festoons of material to be dried are looped over the successive sticks 2, 2 and are thus carried through a drying chamber. The sticks 2, 2 are preferably round throughout so that they may be readily turned.

Each chain 1 is supported by a guide rail 3 which in turn is carried by a supporting rail 4, preferably in the form of an angle bar. Preferably there is also a supplementary rail 5 adjacent each guide rail 3 and parallel therewith. This rail 5 is adapted to limit endwise movement of the sticks 2, and as shown it is in the form of a channel bar.

For the purpose of turning the successive sticks 2, 2 as they pass a given position, I provide two friction blocks 6 of which one is shown in the drawing. These blocks are above the path of travel of the sticks and are so located that their bottom surfaces will frictionally engage the tops of the successive sticks to rotate them as the said sticks are bodily moved by the chain. Preferably as shown each block is positioned vertically above the corresponding chain, but it will be understood that this exact location is not essential.

Each of the blocks 6 is preferably adjustable so as to change the length of the engagement between the block and the successive sticks so that the amount of rotation of the sticks may be correspondingly changed. In order that the blocks may be properly supported, and also in order that they may be adjusted for the purpose described and for other purposes, a block supporting mechanism is provided which is preferably constructed as shown in the drawing. It will be understood that the supporting mechanisms for the two blocks are identical, except for being right and left.

As shown, there is a base bracket 7 which is carried by the angle bar 4, being held in place by means of a set screw 8 and two cap screws 9, 9. Vertically adjustable on the base bracket 7 is a main bracket 10, which is held in place by cap screws 11, 11 extending through slots 12, 12 in the bracket 10. Screws 13, 13 are preferably also provided by effecting vertical adjustment on the bracket when the cap screws 11, 11 have been slightly loosened.

Carried by the bracket 10 is a plate 14 which is preferably vertically adjustable as shown. The bracket 10 carries two cap screws 15, 15 which project through vertical slots 16, 16 in the plate 14. It will be observed that the plate 14 is located well beyond the ends of the sticks 2, 2 and outside of the rail 5.

Projecting inward from the plate 14 are two parallel rods 17 and 18, these being held in place in the plate 14 by means of set screws 19. Carried by the two rods 17 and 18 is a block carrier 20 to which the friction block 6 is secured in any preferred or suitable manner. Preferably the carrier 20 is pivotally supported on one of the rods, that is upon the rod which is in the rearward position taking into account the direction of travel of the chain and the sticks, in this case the rod 17. The carrier is provided with a slot 21 through which the other rod 18 extends. The carrier 20 is held in the proper position on the rods 17 and 18 by means of washers 22, 22 and cotter pins 23, 23.

Preferably, adjustable means is provided for limiting the movement of the carrier 20 and as illustrated this means comprises a screw 24 which is adapted to project into the slot 21 and to engage the top of the rod 18. The screw 24 is provided with a lock nut 25.

Figure 2:
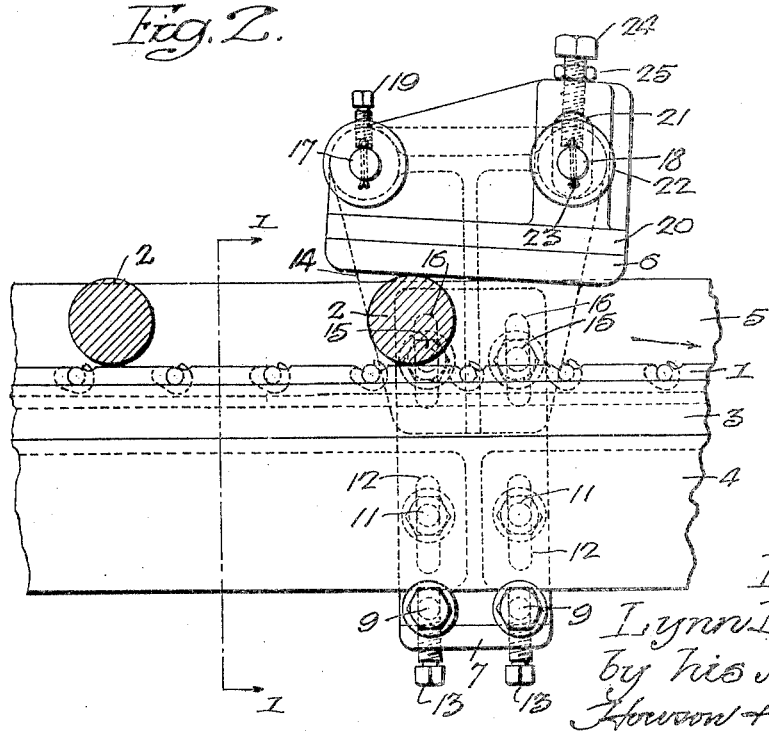
Fig. 2 is a fragmentary elevational view looking at the right hand side of the mechanism as viewed in Fig. 1, this view being partly in section along the line 2—2 of Fig. 1.

In operation the mechanism is so adjusted that the block 6 is properly located with respect to the chain and the sticks, as clearly shown in Fig. 2. As shown in this figure, one of the sticks is just coming into engagement with the bottom surface of the block 6, and it will be observed that as the motion of the chain continues the frictional engagement between the outer surface of the stick and the bottom surface of the block will cause the stick to be turned in the counter-clockwise direction. The block 6 and its carrier will be swung upward about the rod 17 as each stick passes under, the weight of the block and the carrier being sufficient to provide the required frictional engagement.

The length of the frictional engagement and, therefore, the amount of the rotation of the successive sticks can be changed either by changing the initial angle of the block 6 and the carrier 20 or by slightly adjusting these parts vertically or by doing both. The initial angle may be changed by adjusting the stop screw 24. The vertical adjustment may be effected either by moving the bracket 10 with respect to the base bracket 7, or by moving the plate 14 with respect to the bracket 10, or by doing both.

It will be understood that the mechanism can be adapted for different sizes of sticks by bodily adjusting the block and the carrier in the manner already set forth.

What I claim is:

1. The combination with a conveyer chain and a series of transverse sticks carried in part thereby and adapted for supporting festoons of sheet material to be dried, of a device adapted to successively engage the said sticks to rotate them to definite predetermined extents as they are bodily moved by the chain, the said device being adjustable to change the said extents of rotation of the sticks.

2. The combination with a conveyer chain and a series of transverse round sticks carried in part thereby and adapted for supporting festoons of sheet material to be dried, of a friction block so located that its bottom surface will frictionally engage the tops of the successive sticks to rotate them as the said sticks are bodily moved by the chain, and means for changing the length of the frictional engagement between the block and the stick.

3. The combination with a conveyer chain and a series of transverse round sticks carried in part thereby and adapted for supporting festoons of sheet material to be dried, of a block of resilient material so located that its bottom surface will frictionally engage the tops of the successive sticks to rotate them as the said sticks are bodily moved by the chain.

4. The combination with a conveyer chain and a series of transverse round sticks carried in part thereby and adapted for supporting festoons of sheet material to be dried, of a block of resilient material having its bottom surface inclined downward in the direction of travel of the chain and so located that it will frictionally engage the tops of the successive sticks to rotate them as the said sticks are bodily moved by the chain, and means for adjusting the angle of inclination of the said bottom surface of the block to change the length of frictional engagement between the block and the stick.

5. The combination with a conveyer chain and a series of transverse round sticks carried in part thereby and adapted for supporting festoons of sheet material to be dried, of a block of resilient material having its bottom surface inclined downward in the direction of travel of the chain and so located that it will frictionally engage the tops of the successive sticks to rotate them as the said sticks are bodily moved by the chain, means for adjusting the angle of inclination of the said bottom surface of the block to change the length of frictional engagement between the block and the stick, and means whereby the said block and the adjusting means therefor may be bodily adjusted vertically.

6. The combination with a conveyer chain and a series of transverse round sticks carried in part thereby and adapted for supporting festoons of sheet material to be dried, of a block supported near one end for free pivotal movement about a fixed horizontal axis transverse of the chain, the said block being so located that its bottom surface will frictionally engage the tops of the successive sticks to rotate them as the said sticks are bodily moved by the chain, and an adjustable stop for limiting the downward pivotal movement of the block about the said axis.

7. The combination with a conveyer chain and a series of transverse round sticks carried in part thereby and adapted for supporting festoons of sheet material to be dried, of two parallel normally fixed horizontal rods extending transversely of the chain, a member pivotally mounted on one of the rods and having a slot through which the other rod extends, friction means at the bottom of the said member adapted to frictionally engage the tops of the successive sticks to rotate them as the said sticks are bodily moved by the chain, and an adjustable screw in the said member located to engage the second said rod and to limit the pivotal movement of the member about the first said rod.

8. The combination with a conveyer chain and a series of transverse round sticks carried in part thereby and adapted for supporting festoons of sheet material to be dried, of two parallel normally fixed horizontal rods extending transversely of the chain, a vertically adjustable bracket carrying the said rods, a member pivotally mounted on one of the rods and having a slot through which the other rod extends, friction means at the bottom of the said member adapted to frictionally engage the tops of the successive sticks to rotate them as the said sticks are bodily moved by the chain, and an adjustable screw in the said member located to engage the second said rod and to limit the pivotal movement of the member about the first said rod.

9. The combination with a conveyer chain and a series of round sticks adapted for supporting festoons of sheet material to be dried, said sticks being of a circular cross section throughout and the curved bottom surface of each stick resting on the upper surface of the chain, of a block located above the sticks and held against movement in the direction of movement of the chain with its bottom surface in a position to engage the top curved surface of a stick as it is advanced by said chain and so positioned with respect to the upper surface of the chain that the stick will be gripped and consequently rolled between the respective and opposed stick engaging surface of the block and the chain as the chain advances relative to the block.

10. The combination with a conveyer chain and a series of round sticks adapted for supporting festoons of sheet material to be dried, said sticks being of a circular cross section throughout and the curved bottom surface of each stick resting on the upper surface of the chain, of a resilient block located above the sticks and held against movement in the direction of movement of the chain with its bottom surface in a position to engage the top curved surface of a stick as it is advanced by said chain and so positioned with respect to the upper surface of the chain that the stick will be gripped and consequently rolled between the respective and opposed stick engaging surface of the block and the chain as the chain advances relative to the block.

11. The combination with a conveyer chain and a series of round sticks adapted for supporting festoons of sheet material to be dried, said sticks being of a circular cross section throughout and the curved bottom surface of each stick resting on the upper surface of the chain, of a friction block located above the sticks and held against movement in the direction of movement of the chain with its bottom surface in a position to engage the top curved surface of a stick as it is advanced by said chain and so positioned with respect to the upper surface of the chain that the stick will be gripped and consequently rolled between the respective and opposed stick engaging surface of the block and the chain as the chain advances relative to the block.

12. The combination with a conveyer chain and a series of round sticks adapted for supporting festoons of sheet material to be dried, said sticks being of a circular cross section throughout and the curved bottom surface of each stick resting on the upper surface of the chain, of a resilient friction block located above the sticks and held against movement in the direction of movement of the chain with its bottom surface in a position to engage the top curved surface of a stick as it is advanced by said chain and so positioned with respect to the upper surface of the chain that the stick will be gripped and consequently rolled between the respective and opposed stick engaging surface of the block and the chain as the chain advances relative to the block.

LYNN B. CASE.